United States Patent [19]
Haynes

[11] Patent Number: 6,105,721
[45] Date of Patent: Aug. 22, 2000

[54] ACCESSORY FOR USE WITH AN ATV

[76] Inventor: Rusty Haynes, 1331 8th Ave., Birmingham, Ala. 35228

[21] Appl. No.: 09/370,620

[22] Filed: Aug. 6, 1999

[51] Int. Cl.$^7$ .................................................. A01M 31/02
[52] U.S. Cl. ............................................ 182/127; 182/116
[58] Field of Search .................................. 182/127, 63.1, 182/187, 116, 129; 43/1

[56] References Cited

U.S. PATENT DOCUMENTS

| | | | |
|---|---|---|---|
| 4,696,374 | 9/1987 | Hale | 182/127 |
| 5,297,844 | 3/1994 | Haustein | 182/127 |

*Primary Examiner*—Alvin Chin-Shue
*Attorney, Agent, or Firm*—Veal & Associates

[57] ABSTRACT

The present invention relates to an accessory for an ATV (all terrain vehicle) mounted on top of an ATV to allow the use of a stationary ATV as a hunting stand. The accessory is comprised primarily of square metallic tubular members that surround a hunter sitting on an ATV, allowing for waterproof camouflage material to be attached along the outside of the accessory to shield the ATV and user from the sight of passing game. The waterproof camouflage panels also provide a hunter with protection against the elements. The accessory allows a user to sit above the ATV on a seat located at the top of the accessory. Access to this top seat is provided by horizontal tubular members at the rear of the accessory that can be positioned for use as a ladder. The top seat allows a user to have a high vantage point for hunting. The accessory transforms an ATV into a comfortable and effective hunting stand even in an open field.

10 Claims, 4 Drawing Sheets

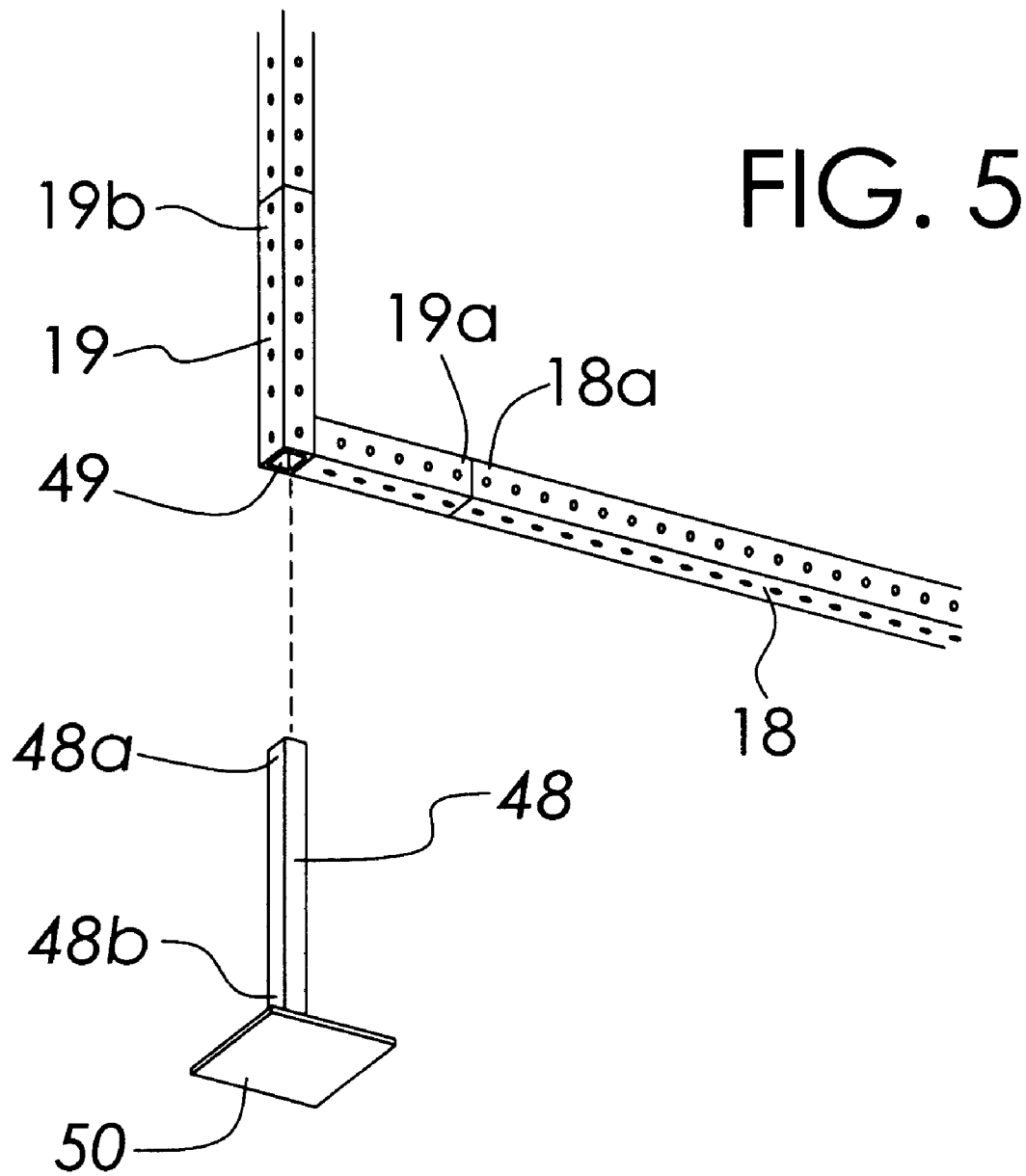

ACCESSORY FOR USE WITH AN ATV

BACKGROUND AND SUMMARY OF INVENTION

The present invention relates to an accessory for an ATV (all terrain vehicle), and more particularly to an accessory mounted on top of an ATV to allow the use of a stationary ATV as a hunting stand.

All terrain vehicles are used by hunters to transport themselves and hunting supplies across rugged terrain to remote hunting locations. Hunting accessories for ATVs directed to the transportation of hunting supplies are well known in prior art. For instance, standard on many ATVs are a front and back horizontal storage rack that can be used for hauling supplies. Other ATV accessories that connect to these racks for use in storing and hauling hunting supplies are readily available, such as specifically designed racks for transporting guns, spotlights, water or fuel containers; or general purpose storage containers such as cargo nets, boxes, packs, saddle bags, and baskets.

The use of ATVs by hunters has been primarily directed to transportation. Typically, ATVs are not used while hunting. Most often a hunter uses an ATV to reach a desired location, then parks the ATV and leaves it behind to hunt. In many of these cases, hunters walk from parked ATVs to traditional hunting stands and return to the ATV only for additional supplies or to use the ATV for transportation to a different location.

All terrain vehicles were not designed for use in a stationary position as a hunting stand. Although it is possible for hunters to hunt while sitting on a stationary ATV, the standard configuration of an ATV places significant limitations on the effectiveness of such a hunting method. All terrain vehicle companies have made only minimal attempts in the last couple of years to overcome these deficiencies by offering ATVs in green and brown camouflage colors, instead of more traditional reds and blues, in recognition of the wide use of ATVs by hunters and possibly to accommodate older or handicap hunters who wish to hunt while sitting on an ATV. In fact, all terrain vehicle companies have started offering ATVs painted in popular camouflage patterns. But even when painted in camouflage, a standard ATV is an ineffective hunting stand because it is a bulky mechanical device that does not readily blend into the natural environment. The readily apparent mechanical structure of an all terrain vehicle wards off game. A standard ATV also does not provide a hunter with a high vantage point for hunting or allow for the storage and transportation of a large volume of hunting supplies.

Another problem with using a standard ATV as a hunting stand is the unsatisfactory level of comfort provided for a hunter sitting on an ATV for long periods of time. A standard ATV provides such a hunter no back support and no protection from the elements.

SUMMARY OF THE PRESENT INVENTION

With the foregoing in mind, it is the principal object of the present invention to provide an accessory that can be mounted on an ATV to allow the use of a stationary ATV as a hunting stand.

It is a further object of this invention to provide an assembly that can be attached to an ATV to allow the use of a stationary ATV as a hunting blind in an open field.

Another object of this invention is to provide an accessory that can be attached to an ATV to provide greater comfort and safety to a user sitting on a stationary ATV for long periods of time, particularly an older or handicap user.

An additional object of this invention is to provide an accessory that can be attached to an ATV to allow the use of a stationary ATV as a viewing stand for outdoor activities including but not limited to birdwatching, nature photography, or scientific research.

These and other objects of the present invention are accomplished through the use of an accessory comprised primarily of square metallic tubular members secured to the top of an ATV. The hunting stand accessory surrounds a hunter sitting on an ATV, allowing for waterproof camouflage material to be attached along the outside of the accessory to shield the ATV and user from the sight of passing game. This is true even in an open field, which can be the best location for a hunting stand. The accessory provides for the attachment along its tubular members of top and side camouflage panels that shield the ATV and user from view. The side camouflage panels are of a bottom-weighted drop down type designed to be readily attached to the hunting stand accessory. When not in use, the side camouflage panels can either be detached from the invention for storage on the ATV or be rolled up and tied while remaining attached to the ATV. The waterproof camouflage panels also provide a hunter with protection against the elements.

The accessory further provides a vertically positioned back rest to give greater comfort to a user sitting on an ATV for long periods of time. In the preferred embodiment, the forward position of the back rest is readily adjustable. Providing additional protection from the elements to a user is a windshield mounted on the hunting stand accessory and means for holding a large umbrella above the user. Because the accessory, in the preferred embodiment, is an all steel cage-like structure that surrounds a user while seated on the ATV, the accessory provides additional safety to a user in the event the ATV overturns during use.

The accessory also provides the option for a user of sitting above the all terrain vehicle on a seat located at the top of the accessory. Horizontal tubular members at the rear of the accessory can be positioned for use as a ladder to provide access to this top seat. The top seat allows a user to have a higher vantage point, and thus greater field of vision, than a user would have sitting on an ATV in the normal sitting position. Thus, the hunting stand accessory transforms an ATV into an effective hunting stand even in an open field. When the top seat of the accessory is utilized, rear support legs are deployed for additional support. The hunting stand accessory provides a means for holding a large umbrella above a user sitting in the top seat, and a means for holding a plurality of tree limbs in a vertical position for camouflage.

This invention also provides means for attaching a large number of traditional ATV accessories thereto, such as spotlights; winches; specially designed racks for transporting guns, spotlights, water or fuel containers; or general purpose storage containers such as cargo nets, boxes, packs, saddle bags, and baskets. This allows an ATV to haul a larger volume and wider variety of hunting supplies than a standard ATV. The invention, which is designed for use when the ATV is stationary, and accessories attached thereto can travel with the ATV without being dismantled.

Although the hunting stand accessory has been primarily designed for use as a hunting stand by hunters, it may also be used as an outdoor stand for other outdoor activities including, but not limited to, birdwatching, nature photography, or scientific research.

BRIEF DESCRIPTION OF THE DRAWINGS

A hunting stand accessory for use with an ATV embodying features of the present invention is depicted in the accompanying drawings which form a portion of this disclosure and wherein:

FIG. 5 is a rear perspective view of the lower potion of the accessory for an ATV showing the rear support members.

DESCRIPTION OF THE PREFERRED EMBODIMENT

Figure 1:
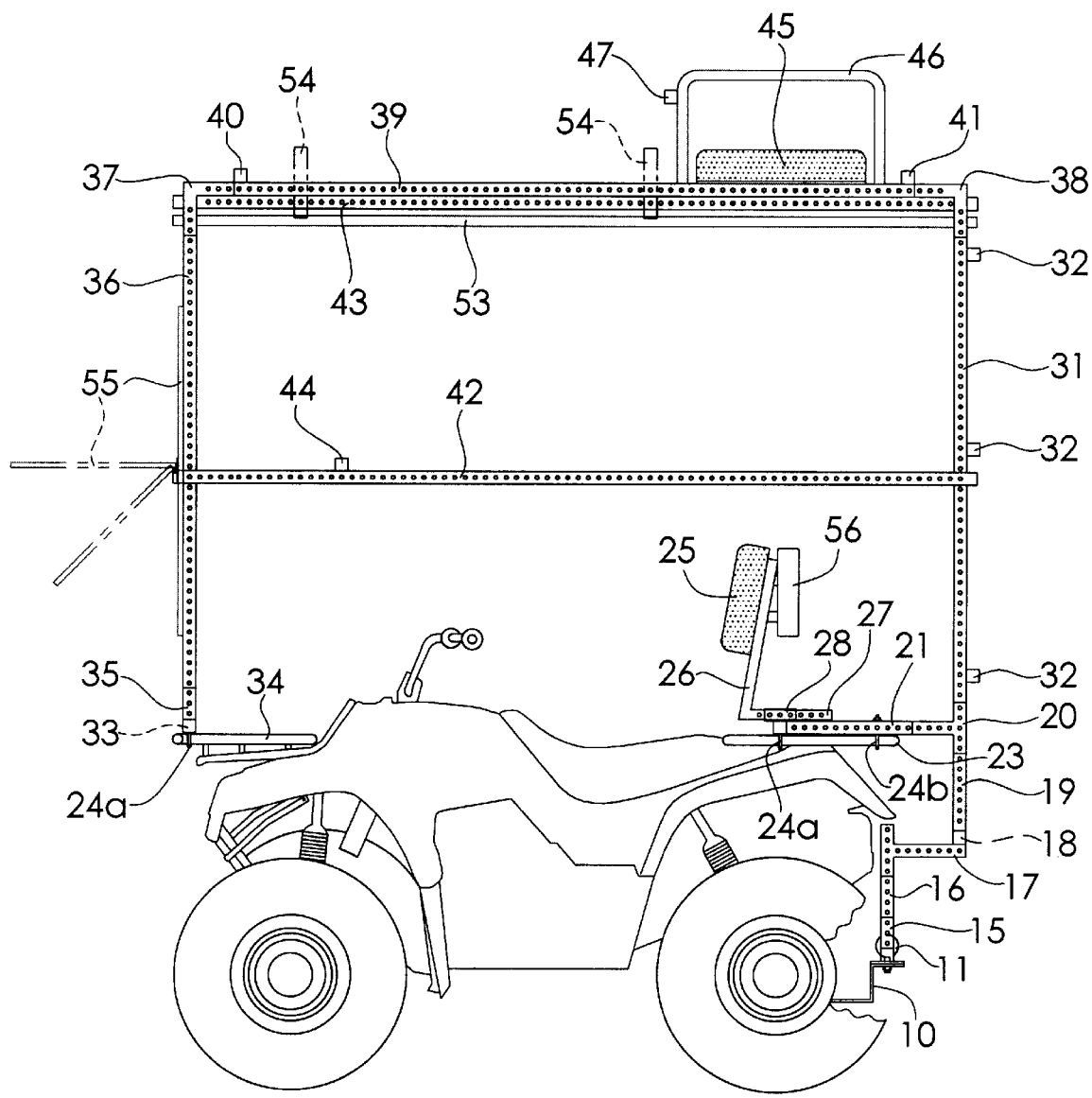
FIG. 1 is a side elevational view of an accessory for an ATV shown mounted on an ATV.
Figure 2:
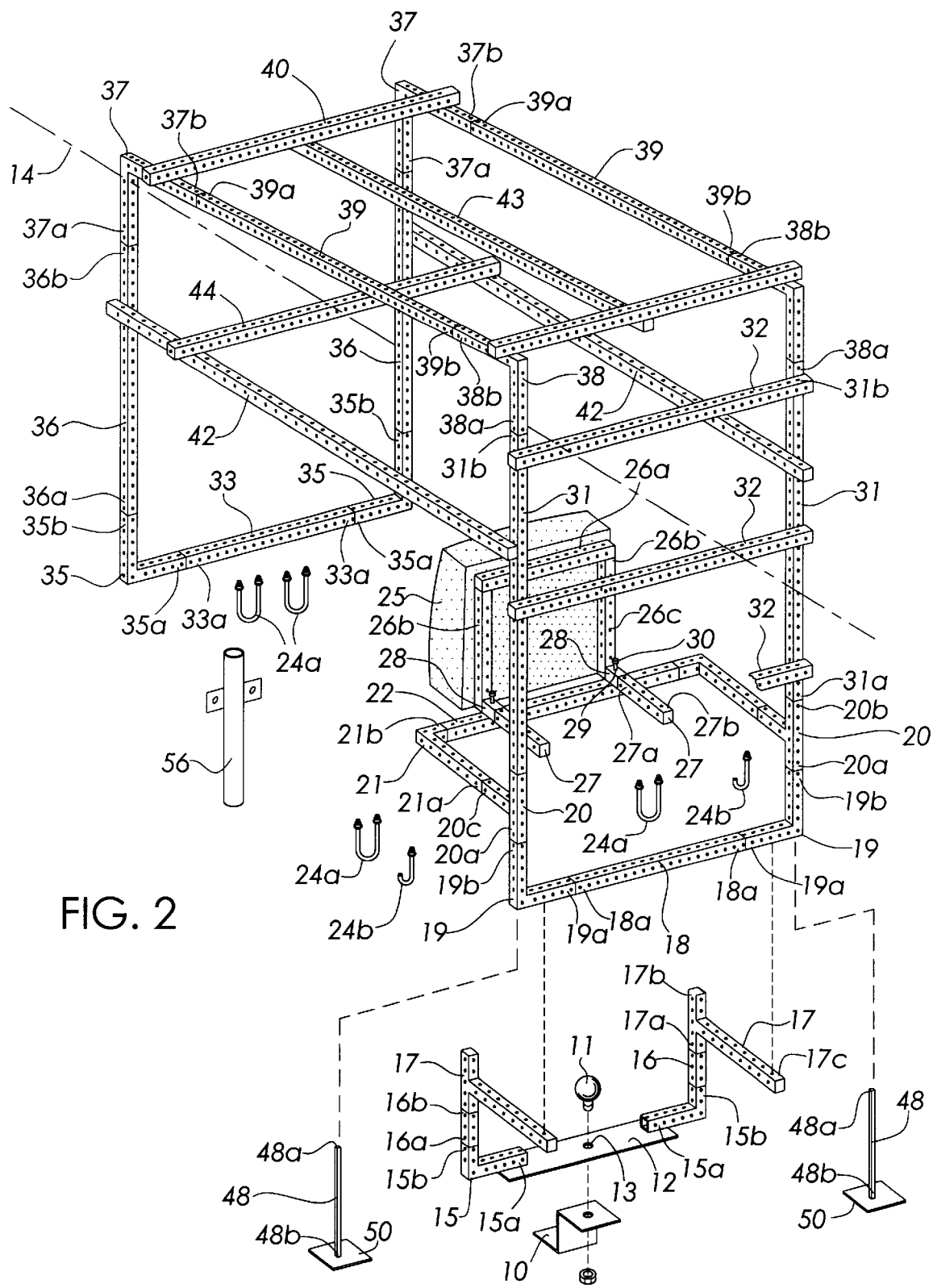
FIG. 2 is a rear perspective view of the accessory for an ATV.
Figure 3:
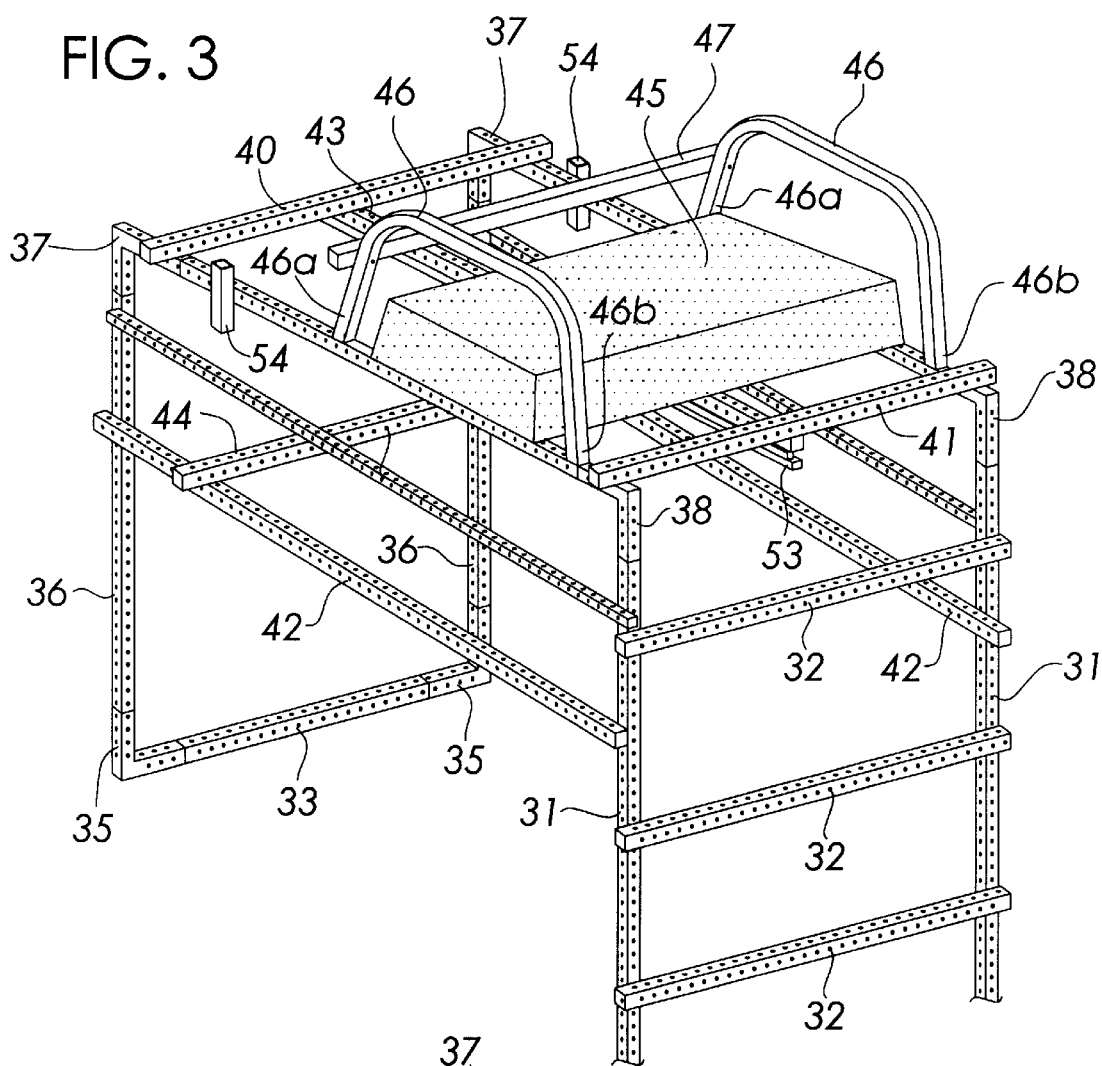
FIG. 3 is a rear perspective view of the upper portion of the accessory for an ATV showing the top seat.
Figure 4:
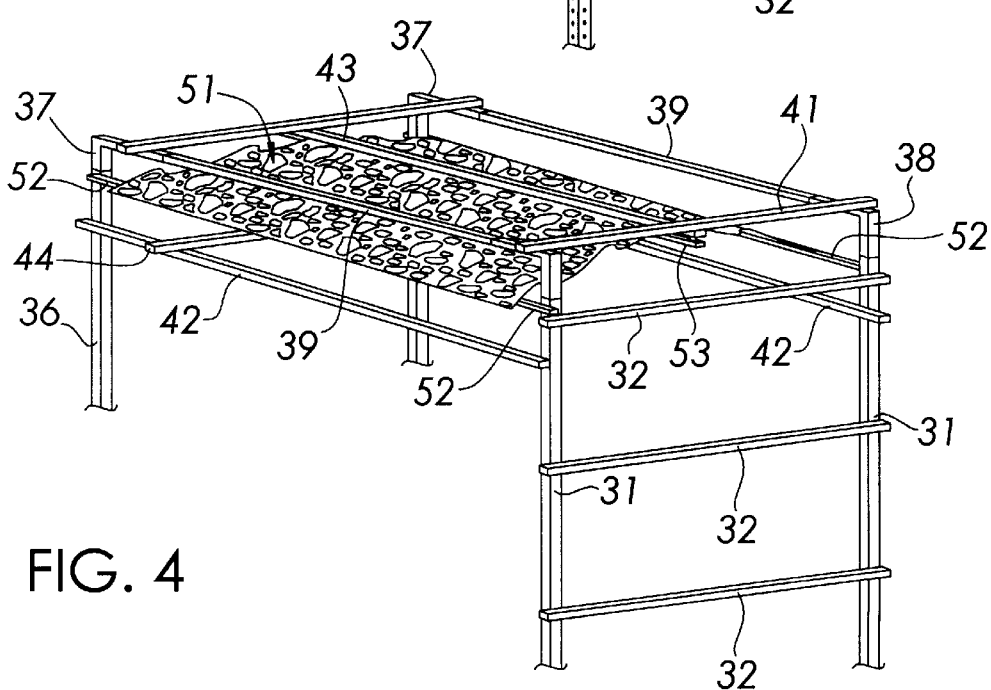
FIG. 4 is a rear perspective view of the upper portion of the accessory for an ATV showing the top canopy.

Referring to FIGS. 1–4 for a clearer understanding of the invention, it may be seen that the preferred embodiment of the accessory is comprised primarily of a plurality of perforated square steel tubular members constructed in the following manner. A means for mounting the accessory to the trailer hitch 10 of an ATV, and more specifically under the trailer hitch ball 11 of an ATV, is comprised of a steel rectangular planar member 12 having a centrally-located cylindrical hole 13 for connection to the trailer hitch ball 11 in a horizontal position. Welded to the top of the rectangular planar member 12 are a pair of L-shaped mount members 15 of perforated hollow square steel tubing having first ends 15a and second ends 15b. The L-shaped mount members 15 are attached to the rectangular planar member 12 on opposite sides of the cylindrical hole 13 in a horizontal position perpendicular to the longitudinal axis 14 of the ATV with the first ends 15a of said L-shaped mount members pointing inward toward the cylindrical hole 13 and the second ends 15b of the L-shaped mount members pointing upward.

Telescopically connected to the upward-facing second ends 15b of the L-shaped mount members are a pair of side mount members 16 of perforated hollow square steel tubing having first ends 16a and second ends 16b. The first ends 16a of the side mount members are telescopically connected in a vertical position to the upward-facing second ends 15b of the L-shaped mount members with the second ends 16b of the side mount members pointing upward.

Telescopically connected to the upward-facing second ends 16b of the side mount members are a pair of T-shaped mount members 17 of perforated hollow square steel tubing having first ends 17a and second ends 17b on the top section of the T-shaped members, and third ends 17c on the stem section of said T-shaped members. The first ends 17a of the T-shaped members are telescopically connected to the upward-facing second ends 16b of the side mount members with the second ends 17b of T-shaped mount members pointing upward. The stem sections of the T-shaped mount members 17 are parallel with the longitudinal axis 14 of the ATV and the third ends 17c of the T-shaped mount members 17 point rearward.

Connected to the upward-facing sides of the stem sections of the T-shaped mount members 17 is a rear base member 18 of perforated hollow square steel tubing. The rear base member 18 is connected in a horizontal position behind the ATV perpendicular to and centered on the longitudinal axis 14 of the ATV. Telescopically connected to the ends 18a of said rear base member are a pair of L-shaped rear frame members 19 of perforated hollow square steel tubing having first ends 19a and second ends 19b. The first ends 19a of the L-shaped rear frame members are telescopically connected to the two ends 18a of the rear base member with the second ends 19b of the L-shaped rear frame members pointing upward.

Connected to the upward-facing second ends 19b of the L-shaped rear frame members 19 are a pair of T-shaped members 20 of perforated hollow square steel tubing having first ends 20a and second ends 20b on the top section of the T-shaped members and third ends 20c on the stem section of the T-shaped members. The first ends 20a of the T-shaped members are telescopically connected to the upward-facing second ends 19b of the L-shaped rear frame members with the second ends 20b pointing upward, the stem sections parallel with the longitudinal axis 14 of the ATV, and the third ends 20c pointing forward.

Connected to the forward-facing third ends 20c of the T-shaped members in a horizontal position are a pair of L-shaped rear members 21 of perforated hollow square steel tubing having a first ends 21a and second ends 21b. The first ends 21a are telescopically connected to the forward-pointing third ends 20c of the T-shaped members with the second ends 21b of the L-shaped rear members pointing inwards. Telescopically connected to the second ends 21b of the L-shaped rear members are two ends of rear cross member 22. Rear cross member 22 is comprised of perforated hollow square steel tubing and is secured in a horizontal position perpendicular to the longitudinal axis 14 of the ATV. In the preferred embodiment, the L-shaped rear members 21 and rear cross member 22 of perforated hollow square steel tubing are secured in a horizontal position to the top of the ATV rear horizontal storage rack 23 using two U-shaped hooks 24 and two J-shaped hooks 25.

In the preferred embodiment, a rectangular back seat rest 25 comprised of a vinyl-covered cushion and flat solid backing is connected to the hunting stand accessory in a substantially vertical position. Attached across the back of the back seat rest 25 is a U-shaped back rest member 26 of perforated hollow square steel tubing having a top element 26a, two side elements 26b, and two ends 26c. The U-shaped back rest member 26 is secured to the back seat rest 25 with the top element 26a parallel to the top side of said back seat rest 25 and the two side elements 26b parallel to the sides of the back seat rest 25. The two ends 26c of U-shaped back rest member are welded to the first ends 27a of seat rest members with an angle of intersection between the seat rest members 27 and side elements 26b of the U-shaped back rest member within a range of 45 to 90 degrees. In the preferred embodiment, the angle of intersection between the seat rest members 27 and side elements 26b is approximately 78 degrees.

The seat rest members 27 are comprised of perforated hollow square steel tubing and connected to the U-shaped back rest member parallel to one another and perpendicular to the bottom edge of the back seat rest 25. The bottom-facing sides of seat rest members 27 are connected in a horizontal position to the upward-facing sides of the rear cross member 22 with the seat rest members 27 parallel to the longitudinal axis 14 of the ATV, with the second ends 27b of seat rest members pointing rearward, and with the back seat rest 25 centered on the longitudinal axis 14 of the ATV. The cushion of the back seat rest is in a substantially vertical position facing forward. In the preferred embodiment, the back seat rest 25 is covered in marine-grade vinyl.

Seat rest members 27 are connected to the rear cross member 22 in the following manner in the preferred embodiment. A pair of channel fittings 28 of hollow square tubing are fixedly attached to the upward-facing side of rear cross member 22 in a horizontal position parallel to the longitudinal axis 14 of the ATV. The channel fittings 28 slidably receive the second ends 27b of said seat rest members. The two sides of each channel fitting 28 has a single round hole 29. These holes 29 in the channel fittings 28 are aligned with holes in the perforated seat rest members 27 and a metal pin 30 is placed through the holes in channel fittings 28 and seat rest members 27 to secure the forward position of the seat rest members 27. The forward position of the seat rest members 27, and also correspondingly the back seat rest 25, can be readily adjusted by removing metal pins 30, sliding the seat rest members 27 forward or backward to the desired position, and reinserting metal pins 30 through the holes 29 in the channel fittings 28 and seat rest members 27.

Connected to the upward-facing second ends 20b of said T-shaped members 20 in a vertical position are a pair of rear post members 31 of perforated hollow square steel tubing having first ends 31a and second ends 31b. The first ends 31a of the rear post members are telescopically connected to the upward-facing second ends 20b of the T-shaped members with the second ends 31b of the rear post members pointing upwards. Three rear rail members 32 of perforated hollow square steel tubing having two ends 32a are fixedly attached in a horizontal position centered on the longitudinal axis 14 of the ATV to the rearward sides of the rear post members 31.

The front portion of the hunting stand accessory is constructed as follows. A front brace member 33 of perforated hollow square steel tubing having two ends 33a is secured to the top side of the ATV horizontal front storage rack 34 in a horizontal position perpendicular to the longitudinal axis 14 of the ATV. In the preferred embodiment, the front brace member 33 is secured in a horizontal position to the top of the ATV front horizontal storage rack 34 using two U-shaped hooks 24. Connected to said front brace member 33 are a pair of L-shaped front members 35 of perforated hollow square steel tubing having first ends 35a and to second ends 35b. The first ends 35a are telescopically connected to the ends 33a of the front brace member with the second ends 35b of the L-shaped front members pointing upward. Completing the front section are a front pair of post members 36 of perforated hollow square steel tubing having first ends 36a and second ends 36b connected in a vertical position to the L-shaped front members 35. The first ends 36a are telescopically connected to the upward-facing second ends 35a of the L-shaped front members with the second ends 36b pointing upward.

To connect the front and rear section of the hunting stand accessory, a front pair of L-shaped top members 37 of perforated hollow square steel tubing having first ends 37a and second ends 37b are telescopically connected at the first ends 37a to the upward-facing second ends 36b of said post members with the second ends 37b pointing rearward. Similarly, at the rear of the hunting stand accessory, a rear pair of L-shaped top members 38 of perforated hollow square steel tubing having first ends 38a and second ends 38b are connected to rear post members 31. The first ends 38a are telescopically connected to the upward-facing second ends 31b of the rear post members with the second ends 38b pointing forward. A pair of top rail members 39 of perforated hollow square steel tubing having first ends 39a and second ends 39b connect the front and rear sections. The first ends 39a are telescopically connected to the rearward-facing second ends 37b of the L-shaped rear top member and second ends 39b are telescopically connected to the forward-facing second ends 38b of the L-shaped rear top members. The top rail members 39 are connected to the hunting stand accessory in a horizontal position parallel the longitudinal axis 14 of the ATV.

Further comprising the accessory is a front support member 40 of perforated hollow square steel tubing fixedly attached to the upward-facing sides of the L-shaped front top members 37, and a rear support member 41 of perforated hollow square steel tubing fixedly attached to the upward-facing sides of the L-shaped rear top members 38. The front and rear support members 40, 41 are secured in a horizontal position perpendicular to the longitudinal axis 14 of the ATV. A pair of side rail members 42 of perforated hollow square steel tubing are fixedly attached, in a horizontal position parallel to and on opposite sides of the longitudinal axis 14 of the ATV, to the outward facing sides of said front post members 36 and said rear post members 31. A center support member 43 of perforated hollow square steel tubing is fixedly attached to the downward-facing sides of the front support member 40 and rear support member 41 in a horizontal position along the longitudinal axis 14 of the ATV. A front cross member 44 of perforated hollow square steel tubing is connected to the upward-facing sides of the side rail members 42 in a horizontal position perpendicular to the longitudinal axis 14 of the ATV.

The preferred embodiment has a top seat near the rear of the ATV. The top seat is comprised of a vinyl-covered rectangular seat cushion and flat solid backing 45 fixedly attached to the upward-facing sides of the top rail members 39 near the L-shaped rear top members 38 in a horizontal position perpendicular to the longitudinal axis 14 of the ATV. In the preferred embodiment, the seat cushion is covered in marine-grade vinyl. On each side of the top seat is a U-shaped seat rail member 46 of hollow square steel tubing having first ends 46a and second ends 46b. The first ends 46a of said seat rail members are fixedly attached to the upward facing sides of said top rail members 39 in front of said seat cushion 45 and the second ends 46b are fixedly attached to the upward-facing sides of the top rail members 39 behind the seat cushion 45. Each rail member 46 is connected in a vertical position parallel with the longitudinal axis 14 of the ATV. Fixedly attached to the rearward-facing sides of said U-shaped seat rail members 46 in a horizontal position perpendicular to and centered on the longitudinal axis 14 of the ATV is a seat rail cross member 47 of hollow square steel tubing. In the preferred embodiment, access to the top seat is provided by said horizontal rear rail members 32, which are positioned for use as a ladder for climbing up the rear side of the hunting stand accessory.

Providing additional rear support when the top seat is in use are a pair of rear support leg members 48 of square steel tubing having top ends 48a and bottom ends 48b. The top ends 48a slide into the L-shaped rear frame members 19 through square holes 49 on the downward-facing side of the rear frame members 19. The square holes 49 are positioned directly below the upward-facing second ends 19b of the L-shaped rear frame members. Each bottom end 48b of said rear support leg members is fixedly attached to a square steel planar members 50, the planar member 50 being larger than the square holes 49. When deployed for use, the rear support leg members 48 are secured to the L-shaped rear frame members 19 in a lowered, vertical position to allow the planar members 50 to rest on the ground. In this position, the upper end of the rear support leg members 48 is fixedly attached to the inside of the L-shaped rear frame members 19. When not in use, the rear support leg members 48 are secured to the inside of L-shaped rear frame members 19 in a raised, vertical position, placing the upward-facing sides of the planar members 50 in contact with the downward-facing sides of the L-shaped rear frame members 19.

The preferred embodiment has a rectangular top canopy 51 made of water resistant or waterproof material. The top canopy is connected along the sides of the hunting accessory to a pair of canopy rail members 52 of hollow square steel tubing fixedly attached, in a horizontal position parallel to and on opposite sides of the longitudinal axis 14 of the ATV, to the outward-facing sides of the front post members 36 and said rear post members 31. A top canopy support member 53 of hollow square steel tubing is fixedly attached at its ends to the downward-facing side of the center support member 43 in a horizontal position along the longitudinal axis 14 of the ATV. The center support member 43 and top canopy support member 53 are connected to allow a gap of approximately one inch between the two. The rectangular top canopy 51 passes through the one-inch gap between said canopy support member 53 and the center support member 43 and rests on the top of the canopy support member 53. Although not shown on the preferred embodiment, a plurality of rectangular side canopy panels of water-resistant or waterproof material may be connected to the sides of said hunting stand accessory. When not in use, these side canopy panels can either be detached from the invention for storage on the ATV or be rolled up and tied while remaining attached to the ATV. The preferred embodiment further comprises a plurality of tree limb holders 54 fixedly attached in a vertical position to the outward-facing sides of the top rail members, and a lexan windshield 55 fixedly attached to the forward-facing sides of the front post members 36. The invention, although designed for use when the ATV is stationary, can travel with the ATV without being dismantled.

It is to be understood that the form of the invention shown is a preferred embodiment thereof and that various changes and modifications may be made therein without departing from the spirit of the invention or scope as defined in the following claims.

What is claimed is:

1. An accessory for an ATV having a front horizontal storage rack, a rear horizontal storage rack, and a trailer hitch, comprising in combination therewith:
   a. a rear base member having two ends and being of hollow square tubing;
   b. means for mounting said rear base member to the ATV trailer hitch in a horizontal position perpendicular to the longitudinal axis of the ATV;
   c. a rear pair of L-shaped frame members of hollow square tubing having a first and second end, the first ends of said rear L-shaped frame members telescopically connected to the two ends of said rear base member;
   d. a pair of T-shaped members of hollow square tubing having a first and second end on the top section of said T-shaped member and a third end on the stem section of said T-shaped member, the first ends of said T-shaped members telescopically connected to the second ends of said L-shaped rear base members with the top section of said T-shaped member in a vertical position;
   e. a pair of L-shaped rear members of hollow square tubing having a first and second end, the first ends telescopically connected to the third ends of said T-shaped members with said L-shaped rear members in a horizontal position;
   f. a rear cross member of hollow square tubing having two ends telescopically connected to the second ends of said L-shaped rear members with the rear cross member in a horizontal position;
   g. means for securing said L-shaped rear members and said rear cross member to said horizontal rear storage rack of the ATV;
   h. a rear pair of post members of hollow square tubing having a first end and a second end, the first ends of said rear post members telescopically connected to the second ends of said T-shaped members with the rear post members in a vertical position;
   i. three rear rail members of hollow square tubing having two ends fixedly attached in a horizontal position to said rear post members;
   j. a front brace member of hollow square tubing having two ends;
   k. means for securing said front brace member to the horizontal front storage rack of the ATV in a horizontal position perpendicular to the longitudinal axis of the ATV;
   l. a pair of L-shaped front members of hollow square tubing having a first and second end, the first ends telescopically connected to the ends of said front brace member;
   m. a pair of front post members of hollow square tubing having a first end and second end, the first ends of said front post members connected telescopically to the second ends of said L-shaped front members with the front post members in a vertical position;
   n. a front pair of L-shaped top members of hollow square tubing having a first and second end, the first ends of said L-shaped front top members telescopically connected to the second ends of said front post members;
   o. a rear pair of L-shaped top members of hollow square tubing having a first and second end, the first ends of said L-shaped rear top members telescopically connected to the second ends of said rear post members;
   p. a pair of top rail members of hollow square tubing having a first and second end, the first ends of each said top rail members telescopically connected to a second end of said L-shaped front top members and the second ends of each said top rail members telescopically connected to a second end of said L-shaped rear top members with the top rail members in a horizontal position parallel with the longitudinal axis of the ATV;
   q. a front support member of hollow square tubing having two ends fixedly attached to said L-shaped front top members in a horizontal position perpendicular to the longitudinal axis of the ATV;
   r. a rear support member of hollow square tubing having two ends fixedly attached to said L-shaped rear top members in a horizontal position perpendicular to the longitudinal axis of the ATV;
   s. a pair of side rail members of hollow square tubing having two ends fixedly attached to said front post members and said rear post members with said side rail members in a horizontal position parallel to the longitudinal axis of the ATV;
   t. a center support member of hollow square tubing having two ends fixedly attached to said front support member and said rear support member in a horizontal position; and
   u. a front cross member of hollow square tubing having two ends fixedly attached to said side rail members in a horizontal position perpendicular to the longitudinal axis of the ATV.

2. An accessory for an ATV as specified in claim 1 further comprising in combination:
   a. a vinyl-covered rectangular seat cushion and flat solid backing fixedly attached to said top rail members near said L-shaped rear top members in a horizontal position;
   b. a pair of U-shaped seat rail members of hollow square tubing having a first and second end, the first and second ends of each said seat rail members fixedly attached to each said top rail member on opposite sides of said seat cushion with each said seat rail member in a vertical position;
   c. a seat rail cross member of hollow square tubing having two ends fixedly attached to said U-shaped seat rail members;
   d. said L-shaped rear frame members wherein each said L-shaped rear frame member has a square hole directly below the second end of each said L-shaped rear frame member;
   e. a pair of rear support leg members of square tubing having a top end and a bottom end and sides smaller in width than the width of said square holes;
   f. means for securing the rear support leg members in a lowered vertical position to the inside of said L-shaped rear frame members with said rear support leg members extending through said square holes, the top end inside the L-shaped rear frame member and the bottom end extending below said L-shaped rear frame member;
   g. a pair of square planar members having sides longer than said square holes and a top and bottom face fixedly attached at the center of said top face in a horizontal position perpendicular to said rear support leg members to the second ends of said rear support leg members; and
   h. means for securing the rear support leg members in a raised vertical position to the inside of said L-shaped rear frame members with the to face of said square planar members in contact with said L-shaped rear frame members.

3. An accessory for an ATV as specified in claim 2 further comprising in combination:
   a. a pair of canopy rail members of hollow square tubing having two ends fixedly attached to said front post members and said rear post members in a horizontal position parallel to the longitudinal axis of the ATV;
   b. a canopy support member of hollow square tubing having two ends fixedly attached at its ends to said center support member in a horizontal position along the longitudinal axis of the ATV with a gap between said canopy support member and said center support member; and
   c. a rectangular top canopy connected along opposite sides to said canopy support members with said top canopy resting on top of said canopy support member below said center support member.

4. An accessory for an ATV as specified in claim 1, 2, or 3 further comprising in combination a plurality of rectangular side canopy panels connected thereto.

5. An accessory for an ATV as specified in claim 1, 2, or 3 further comprising in combination a plurality of cylindrical tree limb holders fixedly attached in a vertical position to said top rail members.

6. An accessory for an ATV as specified in claim 1, 2, or 3 further comprising a lexan windshield fixedly attached to said front post members.

7. An accessory for an ATV as specified in claim 1, 2, or 3 wherein said means for securing said L-shaped rear members and rear cross member to said horizontal rear storage rack of an ATV and said means for securing said front brace member to said horizontal front storage rack of an ATV are U-shaped bolts and J-shaped bolts.

8. An accessory for an ATV as specified in claim 1, 2, or 3 wherein said means for mounting said rear base member to the ATV trailer hitch comprises in combination:
   a. a rectangular planar mount member having a centrally-located cylindrical hole;
   b. means for connecting said rectangular planar member in a horizontal position utilizing said cylindrical hole to the trailer hitch of an ATV;
   c. a pair of L-shaped mount members of hollow square tubing having a first and second end fixedly attached to said rectangular mount member on opposite sides of said cylindrical hole;
   d. a pair of side mount members of hollow square tubing having a first and second end, the first ends of said side mount members telescopically connected in a vertical position to the second ends of said L-shaped mount members;
   e. a pair of T-shaped mount members of hollow square tubing having a first and second end on the top section of said T-shaped member, and a third end on the stem section of said T-shaped member, the first ends of said T-shaped members telescopically connected to the second ends of said side mount members with the stem sections of said T-shaped mount members in a horizontal position parallel with the longitudinal axis of the ATV; and
   f. means for connecting said rear base member to the stem sections of said T-shaped mount members.

9. An accessory for an ATV as specified in claim 1, 2, or 3 further comprising in combination:
   a. a pair of seat rest members of hollow square tubing having a first end and a second end;
   b. means for securing said seat rest members to said rear cross member in a horizontal position parallel to the longitudinal axis of the ATV;
   c. a U-shaped back rest member of hollow square tubing having a top element, two side elements, and two ends;
   d. means for securing the two ends of U-shaped back rest member to the first ends of seat rest members in a substantially vertical position with an angle of intersection between the seat rest members and side elements of the U-shaped back rest member within a range of 45 to 90 degrees;
   e. a back rest comprised of a vinyl-covered rectangular seat cushion and flat solid backing; and
   f. means for attaching the flat solid backing of said back rest to said U-shaped back rest member.

10. An accessory for an ATV as specified in claim 9 wherein the means for securing said seat rest members to said rear cross member comprises in combination a pair of channel fittings of hollow square tubing fixedly attached in a horizontal position to the rear cross member, said fittings slidably receiving said seat rest members, and a pair of metal pins placed through holes in the sides of said fittings and through holes in the seat rest members to secure the forward position of said seat rest members relative to said rear cross member, said forward position being readily adjusted by removing said pins from said fittings and seat rest members, moving said seat rest members forward or backward to the desired forward position, and replacing said pins.

* * * * *